March 10, 1970 C. H. WILLSEY ET AL 3,499,520
EGG HANDLING EQUIPMENT
Original Filed Oct. 15, 1965 4 Sheets-Sheet 1
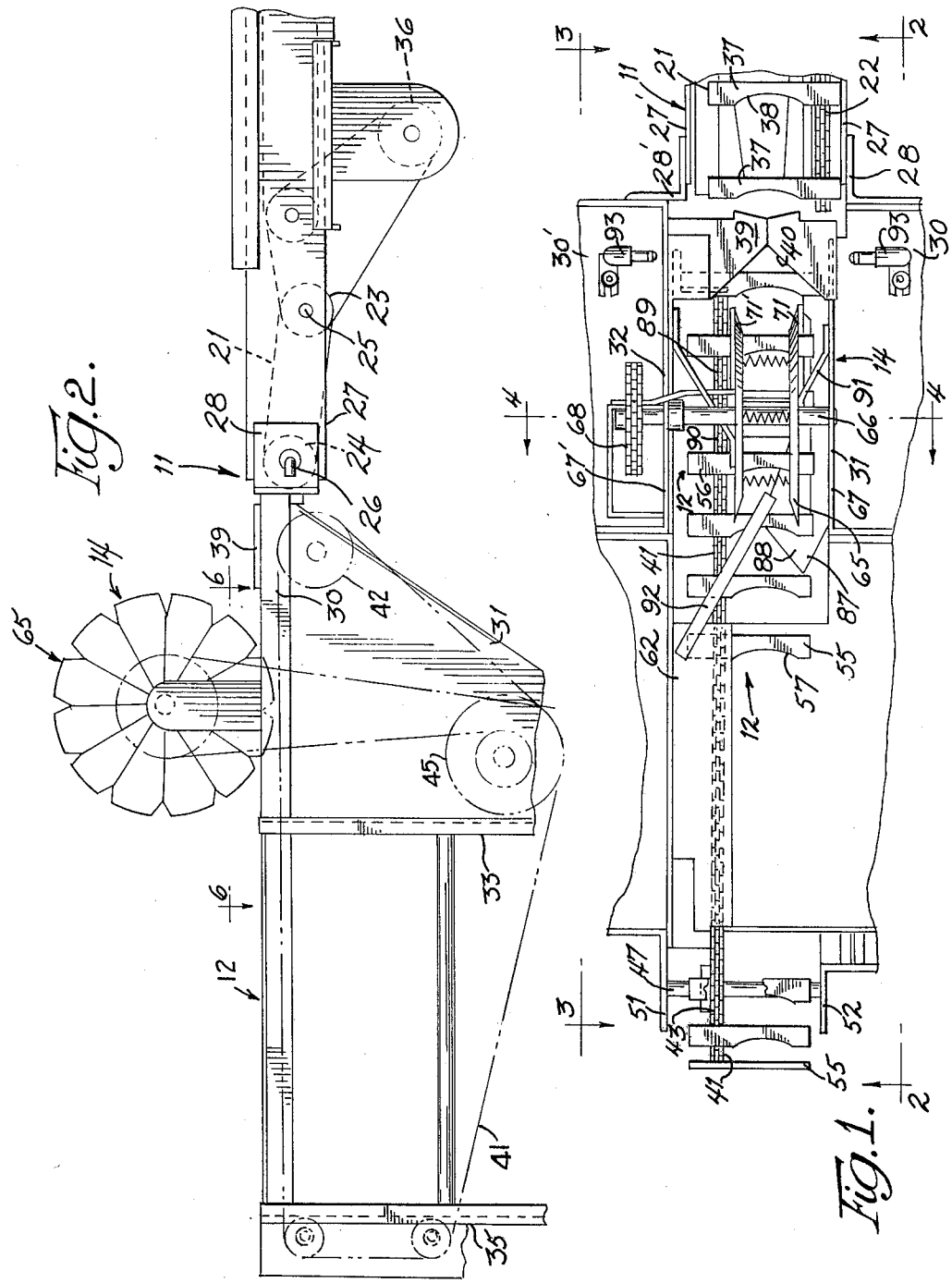
INVENTORS
CHARLES H. WILLSEY
FRANCIS W. MAJORS
BY
ATT'YS.

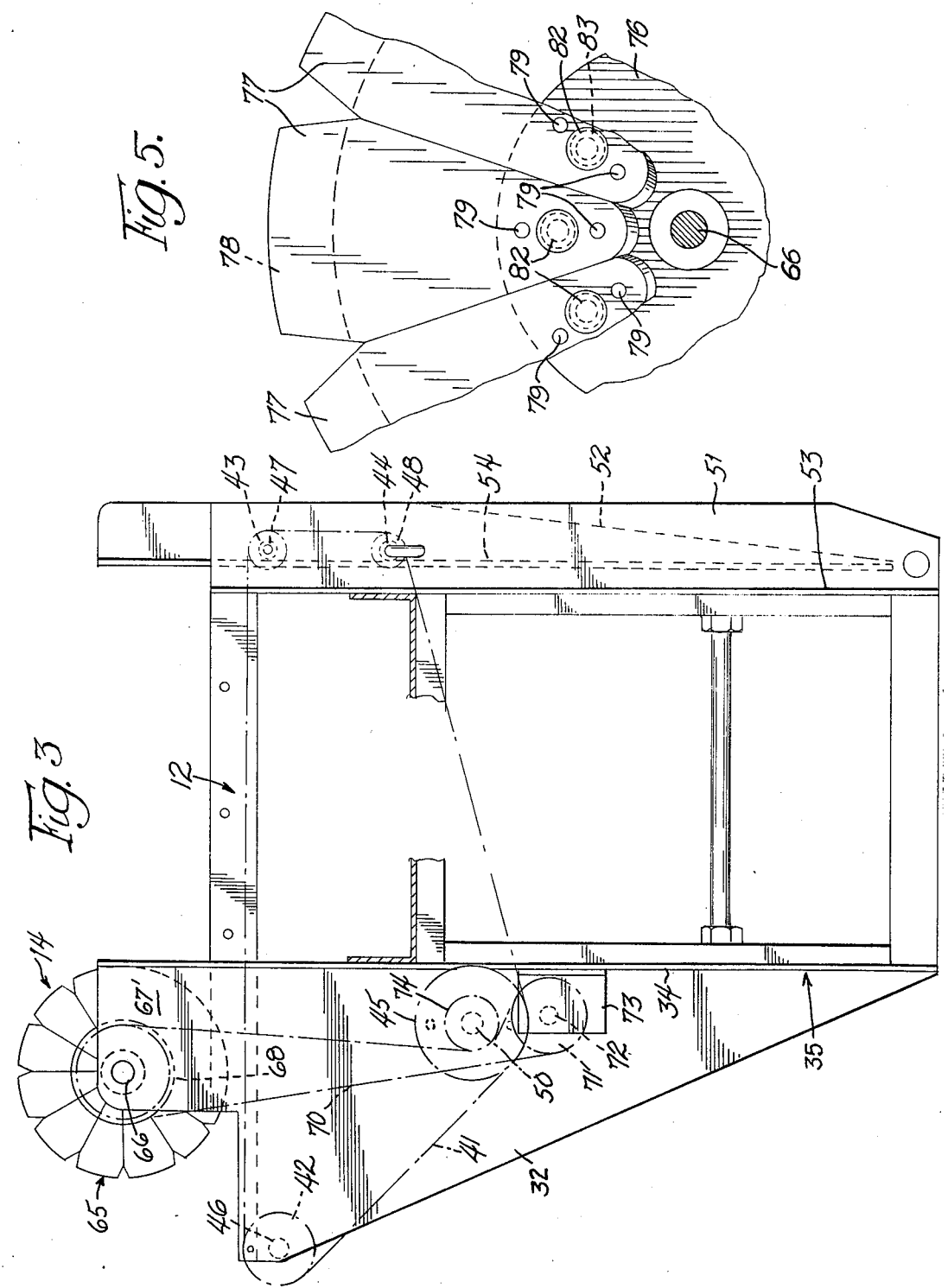

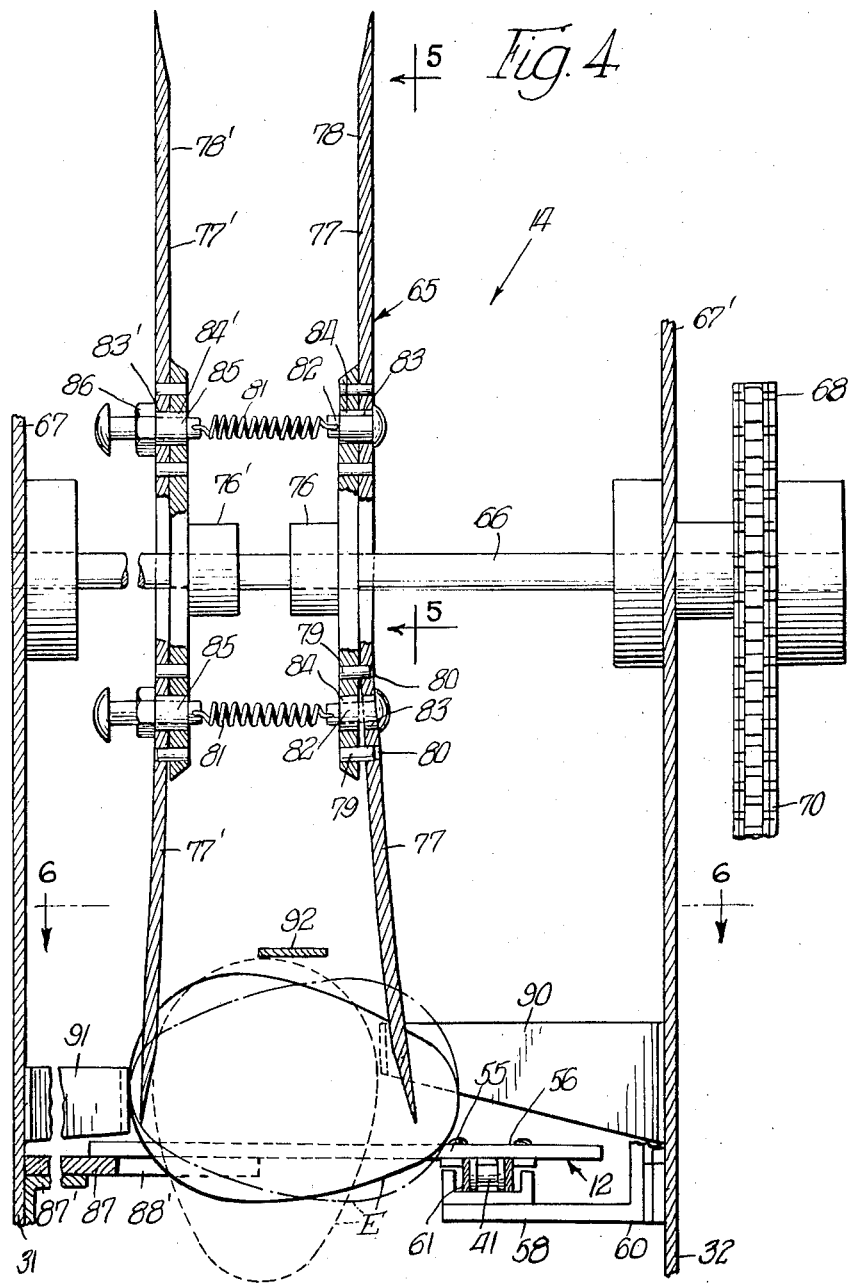

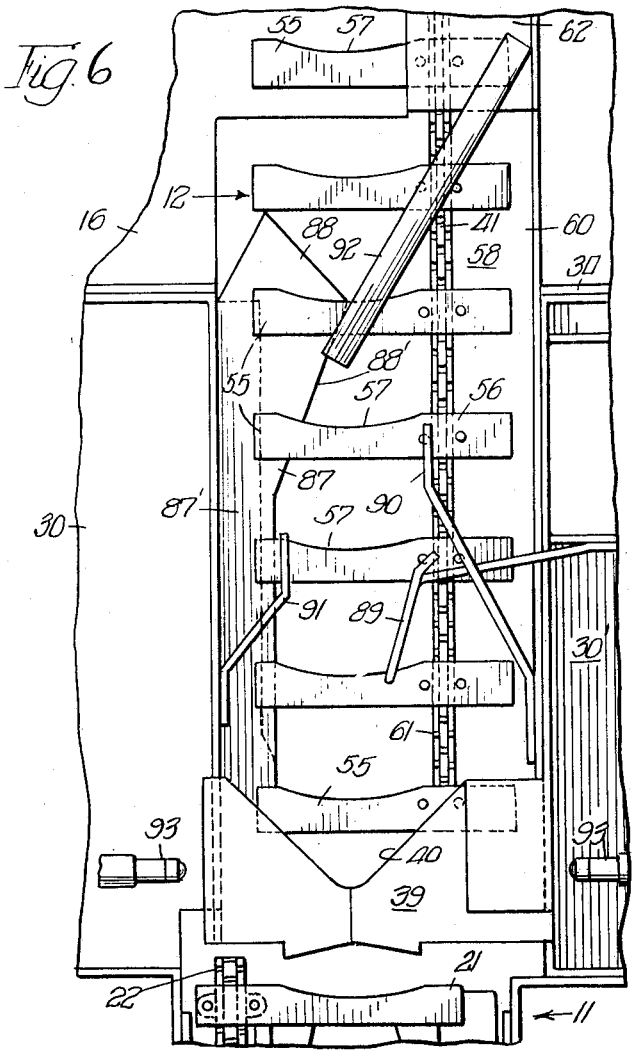

United States Patent Office 3,499,520
Patented Mar. 10, 1970

1

3,499,520
EGG HANDLING EQUIPMENT
Charles H. Willsey, Topeka, and Francis W. Majors, Ozawkie, Kans., assignors, by mesne assignments, to Seymour Foods, Inc., Topeka, Kans., a corporation of Delaware
Original application Oct. 15, 1965, Ser. No. 497,242. Divided and this application Oct. 30, 1968, Ser. No. 771,723
Int. Cl. B65g 47/24
U.S. Cl. 198—33                                           13 Claims

ABSTRACT OF THE DISCLOSURE

An egg handling apparatus comprising an endless conveyor having spaced cross bars for supporting eggs between pairs thereof with the long axes extending transversely of the path of advance and an overhead wheel carrying a pair of axially spaced, resiliently mounted, segmental plates which are arranged to have the peripheral edges engage the top of successive eggs at points adjacent opposite ends of the eggs so as to cause each egg to tilt to a small end down position on the conveyor.

---

This application is a division of application Ser. No. 497,242, filed Oct. 15, 1965.

This invention relates to apparatus for handling articles and is more particularly concerned with improvements in apparatus for arranging articles, such as eggs, in predetermined relation in a row for subsequent transfer in successive groups of a predetermined number to cellular cartons or similar containers or receptacles.

It is a general object of the invention to provide improved apparatus for receiving articles, such as eggs, in random arrangement, and for arranging the same in predetermined relation on a traveling conveyor from which they are transferred in groups or rows of predetermined number to packing receptacles, such as, cellular cartons, filler flats or the like so that the eggs are arranged each in a predetermined position in the cells or pockets provided therefor in the packing receptacles.

It is a more specific object of the invention to provide conveyor apparatus and associated mechanism for receiving eggs in random arrangement, for arranging the eggs in predetermined relation on a pocketed conveyor from which successive row forming groups of the eggs may be transferred to the cells or pockets of a cellular egg carton or filler flat.

It is a still further object of the invention to provide an apparatus for delivering eggs from a supply thereof where they are in random arrangement to a traveling conveyor having pockets for receiving the eggs in single file arrangement and an egg orienting device associated with the conveyor for turning each successive egg in the conveyor pocket so that it is positioned with its long axis in a generally horizontal plane and with the small end of each egg pointing in the same direction.

It is a further object of the invention to provide in an egg handling apparatus mechanism for receiving eggs in random arrangement and for feeding them to a pocketed conveyor with their long axes disposed generally horizontal, together with mechanism for spacing the eggs in pockets on the conveyor and mechanism for orienting

2 the eggs in the pockets so that they have their long axis disposed in a generally horizontal plane with the larger end of each egg in the same position relative to the longitudinal center of the conveyor, the orienting apparatus including means to tilt successive eggs so as to pivot each egg in its pocket and position the eggs on the conveyor in a uniform manner and in a single line.

These and other objects and advantages of the invention will be apparent from a consideration of the egg handling apparatus which is shown by way of illustration in the accompanying drawings wherein:

FIGURE 1 is a plan view of an apparatus illustrating the invention as embodied in a machine for orienting and packing shell egg;

FIGURE 2 is a view taken on the line 2—2 of FIGURE 1;

FIGURE 3 is a view taken on the line 3—3 of FIGURE 1;

FIGURE 4 is a sectional view taken on the line 4—4 of FIGURE 1, to a larger scale;

FIGURE 5 is a fragmentary elevational view taken on the line 5—5 of FIGURE 4; and FIGURE 6 is a fragmentary sectional view taken on the line 6—6 of FIGURE 4.

Referring first to FIGURES 1 and 2 of the drawings, there is illustrated an article handling machine which is particularly designed for arranging eggs, which are delivered to the machine one by one from an infeed conveyor and in random arrangement, in predetermined, spaced relation, on a single line endless traveling conveyor with the individual eggs properly oriented so that the long axis of each egg is generally horizontal and the small end of each egg points in the same direction. The eggs E are fed to the machine by an infeed conveyor mechanism 11 which positions them on a traveling conveyor 12 where they pass beneath the orienting mechanism 14. The orienting mechanism 14 arranges the eggs in single file on the conveyor 12 with their small ends pointing in the same direction.

The eggs E are delivered to the infeed assembly 11 from a supply source by a conveyor (not shown) which deposits the eggs in random arrangement on a short single line infeed conveyor 21 (FIGURES 1, 2 and 6). The infeed conveyor 21 comprises an endless chain 22 supported on a pair of spaced sprockets 23 and 24 mounted on cross shafts 25 and 26 which are journaled at their opposite ends in parallel, vertically disposed, laterally spaced side plates 27 and 27′ constituting a supporting frame which is connected by angle brackets 28 and 28′ to the end walls of a pair of spaced rectangular trays 30 and 30′ supported at the upper edges of vertically disposed, spaced, parallel, triangular-shaped frame plates 31 and 32 extending from side wall plates 33 and 34 at one side of the main frame assembly 35. The one shaft 25 may be driven by chain and sprocket connection with a motor indicated at 36 (FIGURE 2). The chain 22 carries a series of longitudinally spaced, laterally extending plate members 37 (FIGURE 1) each having a forward or leading edge cut on a curve 38 and co-operating with the preceding plate member 37 to form an egg receiving pocket on the top run of the conveyor, the eggs being carried between successive pairs of plates 37 with their long axes generally horizontal. The pocket forming plates 37 are each bolted or otherwise secured at one end to the chain 22 so that they extend in a generally horizontal plane as they traverse the top run thereof. A plate 39 is supported in forwardly and downwardly inclined position at the forward end of the top run of the conveyor 21 so as to form a chute between the conveyors. The plate 39 is bent so as to have a transverse cross section of generally V shape and its forwardmost edge is cut on a V at 40 so that the eggs advanced by the conveyor 21 roll across the inclined plate 39 and down onto the top run of an endless traveling orienting conveyor 12 disposed below the orienting mechanism 14. The chute forming inclined plate 39 which transfers the eggs from the conveyor 21 to the conveyor 12 is supported between the opposed inner edges of the trays 30 and 30′.

The conveyor 12 (FIGURES 1, 3 and 6) comprises an endless chain 41 supported on the sprockets 42, 43, 44 and 45, the two uppermost sprockets 42 and 43 being aligned so that the top run of the chain 41 is in a generally horizontal plane. The sprockets 42, 43 and 44 are mounted on parallel, spaced idler shafts 46, 47 and 48, while sprocket 45 is mounted on a longitudinally extending drive shaft 50 which is operated from the main drive shaft for the machine. The shaft 46 is journaled in the frame plates 31 and 32. The shafts 47 and 48 are journaled in parallel, outwardly extending, vertically disposed flanges 51 and 52 of longitudinally extending frame side plates 53 and 54 at the opposite side of the machine. The endless conveyor chain 41 carries a series of spaced, parallel egg support plates 55, each of which has one end bolted or otherwise secured at 56 to the chain 41 so that it extends generally horizontal plane. Each plate 55 has its forward edge cut on a curve 57 so as to co-operate with the preceding plate in forming a pocket for an egg. The curved edge 57 permits the egg to pivot or turn about its short axis so that it may be rotated as hereinafter described to reverse the position of its small and large ends and enable the eggs to be arranged in uniform position on the conveyor. The top run of the chain 41 is supported on the horizontally disposed flange 58 of an elongate angle bar 60 which has a guide channel 61 mounted on the upper face thereof so as to provide a track for chain 41. A top guard rail or cover plate 62 extends from a point beyond the orienting apparatus 14 across the end of the packing table 16.

The egg orienting apparatus 14 (FIGURES 1, 2, 3, 4, 5 and 6) operates to insure that each successive egg which is delivered to the entrance end of the conveyor 12 is positioned with its long axis generally horizontal and its smaller end disposed on the right as indicated in solid line in FIGURE 4 or it is flipped over to that position if it is fed to the orienter in the position indicated by phantom line in FIGURE 4. This apparatus comprises a wheel assembly 65 which is mounted on a shaft 66 journaled in upstanding, parallel plate members 67 and 67′ integral with the plate flanges 31 and 32. Shaft 66 carries a sprocket 68 (FIGURES 3 and 4) which is connected by a drive chain 70 with the sprocket 71 on a small stub shaft 72 supported on the bearing bracket 73. The drive chain 70 engages a drive sprocket 74 on the longitudinally extending drive shaft 50. The cross shaft 66 (FIGURES 4 and 5) carries a pair of axially spaced hub formations 76 and 76′ and each of the hub formations supports a series of radially extending plates 77 and 77′ of generally triangular shape which are arranged in paired relation and which have their outer ends beveled at 78 and 78′, the beveled portions of each pair thereof facing inwardly in opposed relation to each other. Each of the plates 77 and 77′ is mounted in an identical manner on its respective hub formation. Each plate 77 and 77′ is mounted on a pair of radially spaced pins 79 on hub 76 or 76′ which are slidable in bores 80 in the plate member so that the plate is free to pivot somewhat in a direction outwardly away from the center of the wheel. The plates 77 and 77′ are arranged in paired relation with the plates of each pair thereof opposite each other and urged towards each other by a tension spring 81 which is connected at one end to the shank end of a headed pin 82. The pin 82 extends through aligned bores 83 and 84 in plate 77 and hub member 76, respectively, with sufficient clearance or loose fit to permit pivoting movement of the plate member 77 about its inner end. The other end of spring 81 is connected to the inner end of the shank of a threaded stud bolt 85 which has a loose fit in aligned bores 83′ and 84′ in plate 77′ and hub 76′, respectively. The bolt 85 carries an adjusting nut 86 which can be turned to vary the tension in the spring 81. The two sets of plates 77 and 77′ are axially spaced a distance somewhat less than the long dimension of an egg and the wheel assembly 65 is spaced above the conveyor 12 and timed relative to the conveyor 12 so that when it rotates and eggs are carried beneath the same by the conveyor 12, the beveled ends 78 and 78′ rotate in a path where the ends of each pair of plates will normally engage an egg in a pocket of the conveyor 12 adjacent both ends, indicated in FIGURE 4. The difference in the curvature of the egg surface near the small and large ends is sustantial and this difference in surface contour results in pivoting of the egg in the pocket of the conveyor in a predetermined manner when it is engaged by the plates 77 and 77′. When the end of a plate 77 or 77′ engages the top of an egg near the smaller end of the egg, it exerts a substantial amount of pressure tending to pivot the egg about its short horizontal axis so as to swing the small end of the egg downwardly in the pocket of the conveyor. When the end of the plate 77 or 77′ engages the top surface of the egg adjacent the large end thereof, less pressure is exerted on the egg because of the larger diameter of the surface and the egg tends to slide upwardly along the beveled inside edge of the plate thereby yielding to the greater pressure applied by the oppositely disposed plate which engages at the same time the egg surface adjacent the smaller end thereof. Each pair of plates acting on an egg by reason of the timing of the rotation of the shaft 66 relative to the advance of the conveyor 12 will tend to rotate the egg in the conveyor pocket so as to bring the egg into the position indicated in dotted line in FIGURE 4 with the small end on the bottom.

The egg carrying plates 55 on the conveyor 12 are supported at their free ends as they move beneath the orienting wheel assembly 65 on the guideway forming edge of a horizontally disposed plate member 87 (FIGURES 4 and 6) which is mounted by means of the angle bracket 87′ on the frame member 31. The plate member 87 which is preferably of plastic or similar material is formed with a leading end portion 88 (FIGURE 6) shaped so as to provide an inside edge 88′ which extends diagonally into the path of the eggs on the conveyor 12. The plate edge 88′ is positioned to engage with the smaller ends of the eggs below the conveyor pockets and to insure that each successive egg is tilted to a position where the long axis of each egg is horizontal and the small end points to the right as shown in solid line in FIGURE 4. Three guides or guard members 89, 90 and 91, which may be formed of spring plate material or spring wire, properly bent into the position shown, are arranged immediately above the top run of the conveyor 12 and tend to center the eggs on the conveyor as they approach and leave the orienting wheel assembly 65. A spring wire or spring plate guard member 92 is disposed at the exit side of the orienting wheel assembly 65 in a position to engage the tops of the eggs in the conveyor 12 so as to hold the eggs in the pockets of the conveyor 12 and insure effective operation of the plate edge 88′ in turning the small ends of the eggs in the same direction. A pair of electric eye devices 93 are arranged at the entrance end of the conveyor 12 for sensing eggs which are delivered to the conveyor. The electric eye 93 is incorporated in a control circuit for operating the machine so as to insure that each successive pocket on the conveyor 12 is supplied with an egg and that the conveyor will be stopped if there is a failure in the feed of the eggs.

In using the apparatus the eggs are supplied by the infeed conveyor 11 and under the control of the electric eye 93 on the conveyor 12 is operated to advance the eggs to the orienting device 14 which flips over any eggs which are fed to the pockets of the conveyor in the position shown in phantom line in FIGURE 4 so that the eggs advance in single file and in properly oriented position as shown in solid line in FIGURE 4.

We claim:

1. Apparatus for handling shell eggs comprising an endless conveyor having longitudinally spaced, pocket forming cross bar members mounted thereon, said conveyor having a run where the cross bar members travel in a generally horizontal plane, each cross bar member having an edge which is curved so that each bar forms with an adjoining cross bar member a pocket defined in part by said curved edge in which an egg may be supported with its long axis disposed horizontally, means for delivering eggs in random position into the pockets of the conveyor, means disposed above the horizontal run of said conveyor which is adapted to engage successive eggs at opposite ends of their uppermost surface and rotate the eggs which have the smaller end at one side of the conveyor to a position where the long axis is generally vertical and means to position the eggs with the long axis thereof disposed generally horizontal and the smaller end at the opposite side of the conveyor.

2. Apparatus as recited in claim 1, and said egg engaging means comprising a wheel-like frame mounted for rotation above the horizontal run of the conveyor and adapted to engage opposite ends of eggs which are disposed in generally horizontal position on the conveyor.

3. Apparatus as recited in claim 2, and said wheel-like frame comprising axially spaced plate-like members having peripheral edges which are adapted to engage the opposite ends of the eggs.

4. Apparatus as recited in claim 3, and said plate-like members comprising a plurality of segments mounted for resilient engagement with upwardly facing surfaces of the eggs.

5. In an apparatus for handling shell eggs which comprises an endless traveling conveyor having longitudinally spaced pocket forming members mounted thereon with the conveyor having a run where the pocket forming members travel in a generally horizontal path, said pocket forming members having at least one egg engaging edge curved so that an egg may be supported with its long axis disposed horizontally and the egg free to rotate about its short axis, means for delivering eggs into the pockets of the conveyor with the ends thereof in random position, and means including a rotatably mounted wheel on an axis extending transversely of the conveyor path and having axially spaced segmental plate members positioned to engage the uppermost egg surface for rotating each egg which is positioned otherwise so that it is disposed in a conveyor pocket with the long axis thereof generally horizontal and the smaller end facing in a predetermined direction.

6. Apparatus as recited in claim 5, and said egg rotating means comprising a guide bar mounted at one side of the path of the conveyor with an egg engaging edge extending diagonally toward the longitudinal center of the conveyor in the direction of advance thereof.

7. Apparatus as recited in claim 1, and power drive means for advancing the traveling conveyor and control means for said power drive means which is responsive to the passage of an egg to a pocket in the conveyor so as to stop the conveyor when the delivery of eggs is interrupted.

8. Apparatus for handling shell eggs comprising an endless conveyor having longitudinally spaced, pocket forming cross members mounted thereon with the conveyor having a top run where the pocket forming members travel in a generally horizontal path, each pocket having a curved egg engaging edge so that an egg may be supported in the pocket with its long axis disposed horizontally and the egg free to tilt about an axis extending longitudinally of the conveyor, means for delivering eggs into the pockets of the conveyor in random position, with the long axis of each egg generally horizontal, and means mounted adjacent the path of the conveyor for engaging the top surface of an egg at opposite ends to tilt the same to a generally vertical position and thereafter to position each egg in a pocket with the long axis thereof disposed generally horizontal and the smaller end of the egg at the same side of the conveyor.

9. Apparatus for handling shell eggs comprising an endless conveyor having longitudinally spaced, pocket forming cross members mounted thereon with the conveyor having a top run where the pocket forming members travel in a generally horizontal path, each pocket having a curved egg engaging edge so that an egg may be supported in the pocket with its long axis disposed horizontally and the egg free to tilt about an axis extending longitudinally of the conveyor, means for delivering eggs into the pockets of the conveyor in random position, with the long axis of each egg generally horizontal, and means adjacent the path of the conveyor for tilting the eggs so as to position each egg in a pocket with the long axis thereof disposed generally horizontal and the smaller end of the egg at the same side of the conveyor, said means for tilting the eggs comprising a wheel-like frame mounted on a cross shaft above said conveyor, said frame including axially spaced plate assemblies having peripheral margins disposed to engage opposite ends of the upper surfaces of eggs which are horizontally positioned on the conveyor, said plate assemblies comprising plate sections which are mounted for movement to permit the marginal portions to move outwardly away from each other as they engage with an egg, and tension springs connecting said plate sections to normally hold said plate sections in parallel, axially spaced planes.

10. An apparatus for arranging shell eggs for packaging comprising a conveyor having a generally horizontal run and pocket forming means for supporting successive eggs with the long axis thereof in a plane extending generally transverse of the path of advance of the conveyor, each egg resting on spaced points on its circumference which are approximately in the plane of its short axis with the egg free to rotate about said spaced points, means mounted above the conveyor run for engaging the topmost surface of each successive egg at points adjacent the opposite ends of the long axis thereof as the egg advances beneath the same whereby to bias the smaller end of the egg lower and the larger end higher and thereby rotate the egg to a position with the long axis generally vertical and the larger end uppermost, and means for tilting the vertically disposed eggs to bring them into uniform predetermined position in said pockets.

11. Apparatus as recited in claim 10, and said means for engaging the topmost surface of the eggs comprising a pair of generally parallel, plate-like members mounted in spaced relation on an axis extending transversely of the path of advance of the conveyor and having peripheral edges which are adapted to engage the egg surfaces as the eggs are advanced beneath the same.

12. Apparatus as recited in claim 11, and said plate-like members having the edges thereof which engage the egg surfaces resiliently urged into engagement with said surfaces.

13. Apparatus for handling shell eggs comprising an egg supporting conveyor having longitudinally spaced, pocket forming, parallel cross members mounted thereon and traveling in a generally horizontal path, pairs of adjacent cross members forming egg receiving pockets between their spaced edges so that an egg may be supported in each pocket with its long axis disposed in a plane extending transversely of the path of the conveyor and its short axis disposed in a plane extending generally in the direction of advance of the conveyor, and with the egg supported at spaced circumferential points and free to rotate about an axis extending generally in the direction of advance of the conveyor, means for delivering eggs into the pockets of the conveyor in random arrangement with the long axis of each egg generally horizontal, and means disposed above the path of the conveyor and operative in generally parallel vertical planes for engaging the top surfaces of successive eggs at points adjacent the ends thereof as the conveyor advances the eggs beneath said means whereby to rotate each egg to a position in the conveyor pocket where its long axis is disposed generally vertical and the smaller end of the egg at the bottom thereof.

References Cited

UNITED STATES PATENTS 2,895,589   7/1959   Rostron _____ 198—33

RICHARD E. AEGERTER, Primary Examiner